(12) United States Patent
Piercey, III

(10) Patent No.: US 10,112,519 B2
(45) Date of Patent: Oct. 30, 2018

(54) SLIDING LOADING LIFTING SYSTEM AND METHOD OF USE

(71) Applicant: Gerald S. Piercey, III, Glendale, AZ (US)

(72) Inventor: Gerald S. Piercey, III, Glendale, AZ (US)

(*) Notice: Subject to any disclaimer, the term of this patent is extended or adjusted under 35 U.S.C. 154(b) by 131 days.

(21) Appl. No.: 13/694,568

(22) Filed: Dec. 13, 2012

(65) Prior Publication Data

US 2013/0243563 A1 Sep. 19, 2013

Related U.S. Application Data

(60) Provisional application No. 61/630,578, filed on Dec. 15, 2011.

(51) Int. Cl.
| | |
|---|---|
| *B60P 1/38* | (2006.01) |
| *B60P 1/30* | (2006.01) |
| *B60P 3/077* | (2006.01) |
| *B60P 3/07* | (2006.01) |
| *B60P 3/12* | (2006.01) |

(52) U.S. Cl.
CPC .......... *B60P 1/30* (2013.01); *B60P 3/07* (2013.01); *B60P 3/077* (2013.01); *B60P 3/122* (2013.01)

(58) Field of Classification Search
CPC .. B60P 1/28; B60P 1/435; B60P 1/365; B60P 3/00; B60P 3/077; B60P 1/30

USPC .................................................. 414/477–479
See application file for complete search history.

(56) References Cited

U.S. PATENT DOCUMENTS

| | | | |
|---|---|---|---|
| 6,099,232 A * | 8/2000 | Dixon et al. ................... | 414/494 |
| 9,017,003 B2 * | 4/2015 | Nims .................... | A61G 3/0236 |
| | | | 414/479 |

* cited by examiner

*Primary Examiner* — Gerald McClain
*Assistant Examiner* — Willie Berry, Jr.

(57) ABSTRACT

The present invention relates to a motorized device that can be operated by one person to load or unload a platform containing cargo or a wheel chock attached to a motorcycle or multi-wheeled vehicle, or bins and containers holding cargo. The device taught herein is employed to lift or move the cargo to the level of the truck bed or storage area and move into the storage or travel to a second position. Also disclosed is a sliding ramp apparatus for moving cargo to a higher level or lower level or movement on the same plane or level using incline, horizontal or vertical movement. When mounted on a platform or motorized vehicle, any cargo: machinery, motorcycle, containers, palettes, drums, supplies, etc. can be loaded or unloaded in or on a vehicle or platform in a lifting or lowering manner. When mounted on any surface, any cargo (worktables, machinery, crates, containers, pallets, drums, supplies, boats, etc.) can be moved horizontally and/or vertically for access or convenient height, human contact or manipulation of cargo or process in manufacture.

5 Claims, 9 Drawing Sheets

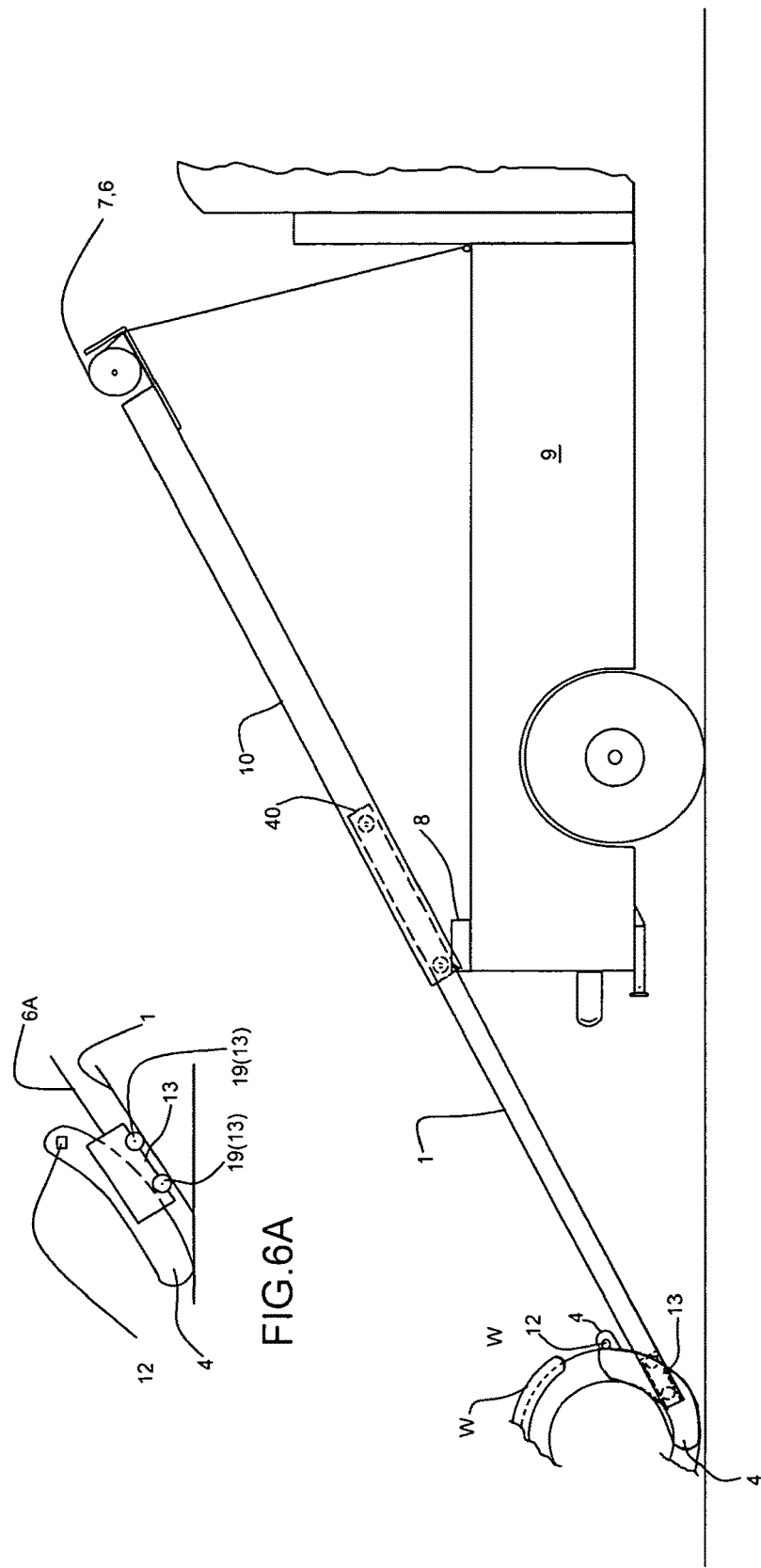

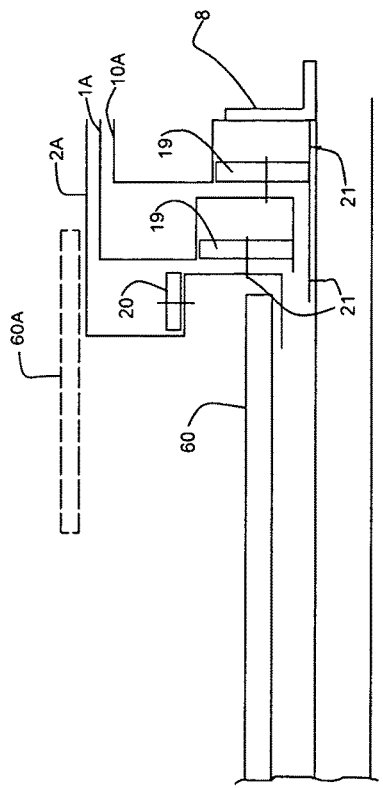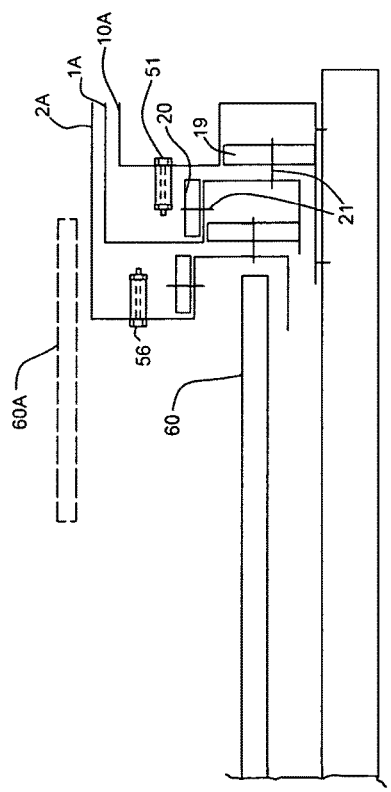

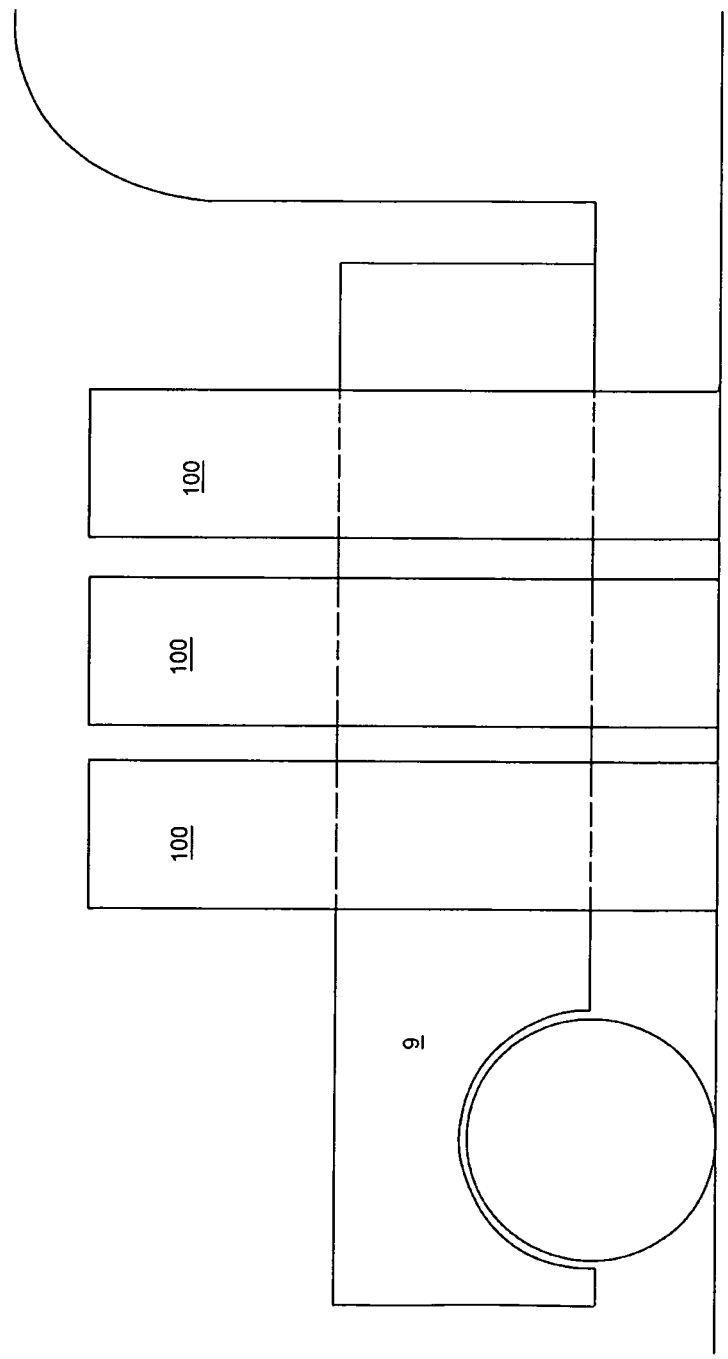

SLIDING LOADING LIFTING SYSTEM AND METHOD OF USE

CROSS-REFERENCE TO RELATED APPLICATIONS

This application claims priority to provisional patent application Ser. No. 61/630,578 filed Dec. 15, 2011.

FIELD OF THE INVENTION

The present invention relates generally to an apparatus for movement: sliding, loading, lifting of supplies, motorcycles, cargo, or equipment using telescoping tray rails or beams to move platforms, wheel chocks, cargo up, down or horizontally in a precise and controlled direction on bearing systems.

BACKGROUND OF THE INVENTION

Most current cargo handling systems provide basic movement but lack the flexibility of telescoping with extreme movement or travel or reach, as well as the ability to increase reach for travel at a later date as an optional piece of equipment. Also lacking are the numerous material handling platforms provided by this invention. Also missing in current art is the second or third winch or more to control tilt angle of the tilt base unit as well as a loading winch to move cargo onto the platforms, trays, or wheel chocks as well as other materials on to custom racks, bins, or containers.

Devices of many types and configurations are available, however the ability to remove the lift system from the truck or mounting area by one person in less than two minutes is lacking. Of great importance is the ability of the loader, lift system to be small enough that the truck bed is still usable for many cargoes. The industry has focused on massive structures that may not have the structural integrity of the tempered aluminum and other materials type system herein.

BRIEF DESCRIPTION OF THE DRAWINGS

The invention will be better understood from a reading of the following detailed descriptions taken in conjunction with the drawing figures in which like references designations are used to designate like elements and in which:

FIG. 5 defines an optional embodiment of the invention with the addition of optional full length tray 13B which in position 1 is pivotally mounted to chock 4 or dolly 13 and is flat on the ground and in position 2 is cradled in telescoping slides 1, 2 and others and tilt unit 10 in the loaded position on the truck or platform.

FIG. 6 is a side view of the invention which depicts the loader attached to a pickup truck for loading motorcycles or cargo.

FIG. 6A is a schematic view of elements in FIG. 6.

FIG. 7A is a rear view of the cut metal before bending.

FIG. 7B is a top view after bending.

FIG. 7C is a side view after bending.

FIGS. 8 and 8A are end views of the invention of another embodiment of the invention which show the S RAILS serving as the drawer guides for massive drawers or platforms or work tables.

FIG. 9 is a side view of the first embodiment of the invention which shows the use of multiple loaders in parallel for large cargoes or large deck platforms.

DETAILED DESCRIPTION OF THE INVENTION

Figure 1:
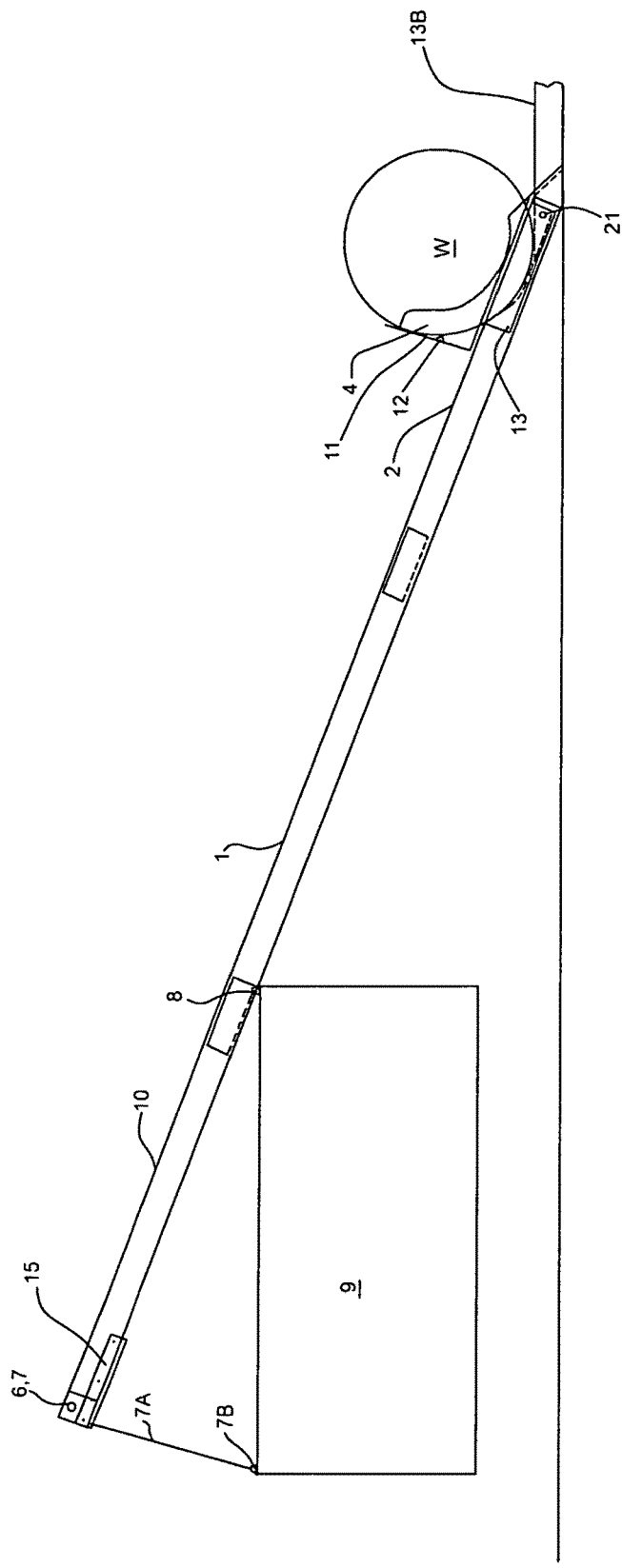
FIG. 1 is side view of the invention detailing the loading start or first position with the upper mounted tilt 10 bolted to the truck with mount 8.

As shown in FIGS. 1-9 a preferred embodiment of an improved sliding loading system 100 includes a tilt unit 10 pivotally mounted to the mounting brackets 8 which are mounted on truck 9 or directly mounted to the truck bed 9 or other mounting surface. The tilt unit 10 incorporates one or more winches 7 to control the tilt or winch 6 to pull up slide unit or slide 1 or slide 1 and optional slide units or slides 2 and others and dolly 13, dolly tray 13A as well as chock 4 or lower said elements back and forth up and down with hydraulic, pneumatic or worm drive or electric winches 6, 7.

FIG. 1 is a side view detailing the wheel chock 4 with motorcycle W or platform in the loading or start first position on the ground by unspooling winch slide cable 6A (FIG. 6A) to slide the telescoping slide 1 and dolly 13 and attached wheel chock 4 out and downward to the stops at the lower end of the slide 1 while still attached to tilt unit 10 with a plurality of bearings in the grooves or bearing raceways of tilt unit 10 (FIG. 4) and stout stop structures 51, 56 (FIG. 3, 9) to prevent over travel. In this downward first position the tilt cable winch 7 is unspooled to elevate and tilt the winches 6, 7 and the front of the tilt unit 10 upward to provide a downward tilt of the wheel chock 4 by pivoting on mounting brackets 8.

The wheel chock 4 on the dolly 13 receives the wheel of the motorcycle W. The dolly 13 has vertical bearings 19(13) of FIG. 4 which act as wheels and provide for movement of the dolly 13 onto, into and off of the slide 1 (FIGS. 1, 2 and 3).

Other elements that are shown are tilt winch cable 7A and connection point 7B, beam 12 attached to flange 11 which is attached to wheel chock 4 and winch support 15.

Figure 2:
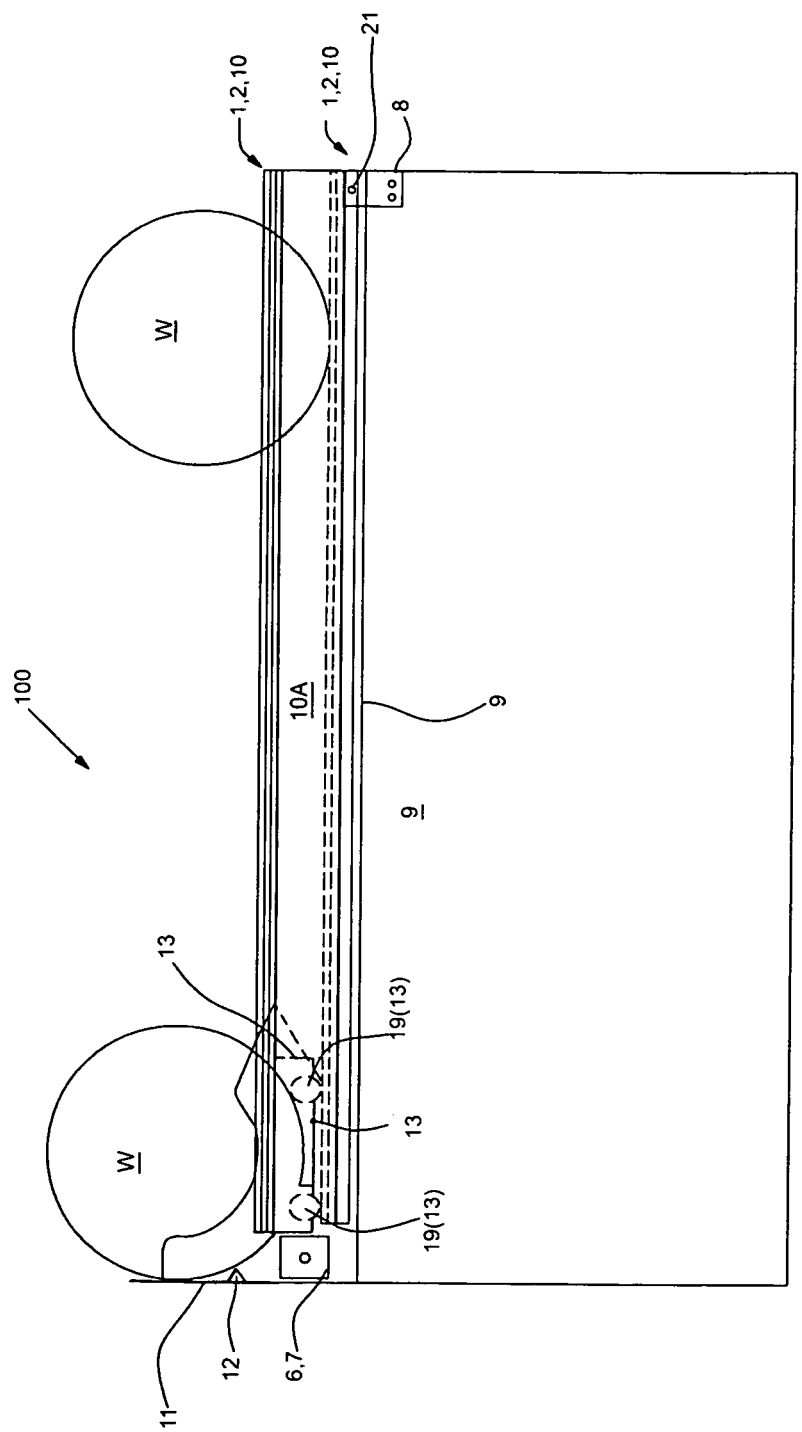
FIG. 2 is side view of the invention detailing the loaded or second position of a motorcycle on a truck or work stand.

FIG. 2 shows the telescoping dolly 13 with wheel chock 4 and slides 1, 2 pulled in by winch 6 (behind winch 7) to the center of tilt unit 10 and winch 7 pulled in to force the winch end of the tilt unit 10 to pivot into the downward or loaded second position. When tilt unit 10 is pulled downward to the second position representing the loaded position, the winch 7 maintains a constant downward force keeping the tilt unit 10 down securely thereby keeping the wheel chock and front of the cargo W (motorcycle) securely fastened to the truck or mounting surface. The rear of the loader 100 is held securely in place by the mounting brackets 8 mounted to the truck or mounting surface. The cargo or motorcycle W is secured to the end of the tilt unit opposite of the winches to hold down the rear of the motorcycle or cargo W in transit or storage. The wheel chock 4 and dolly 13 are pulled inward by winch 6 to stop at winch 6 in the second position securely held in place by winch cable tension. The cargo W is required to be also secured to the truck or mounting surface at both ends as a safety factor.

Figure 3:
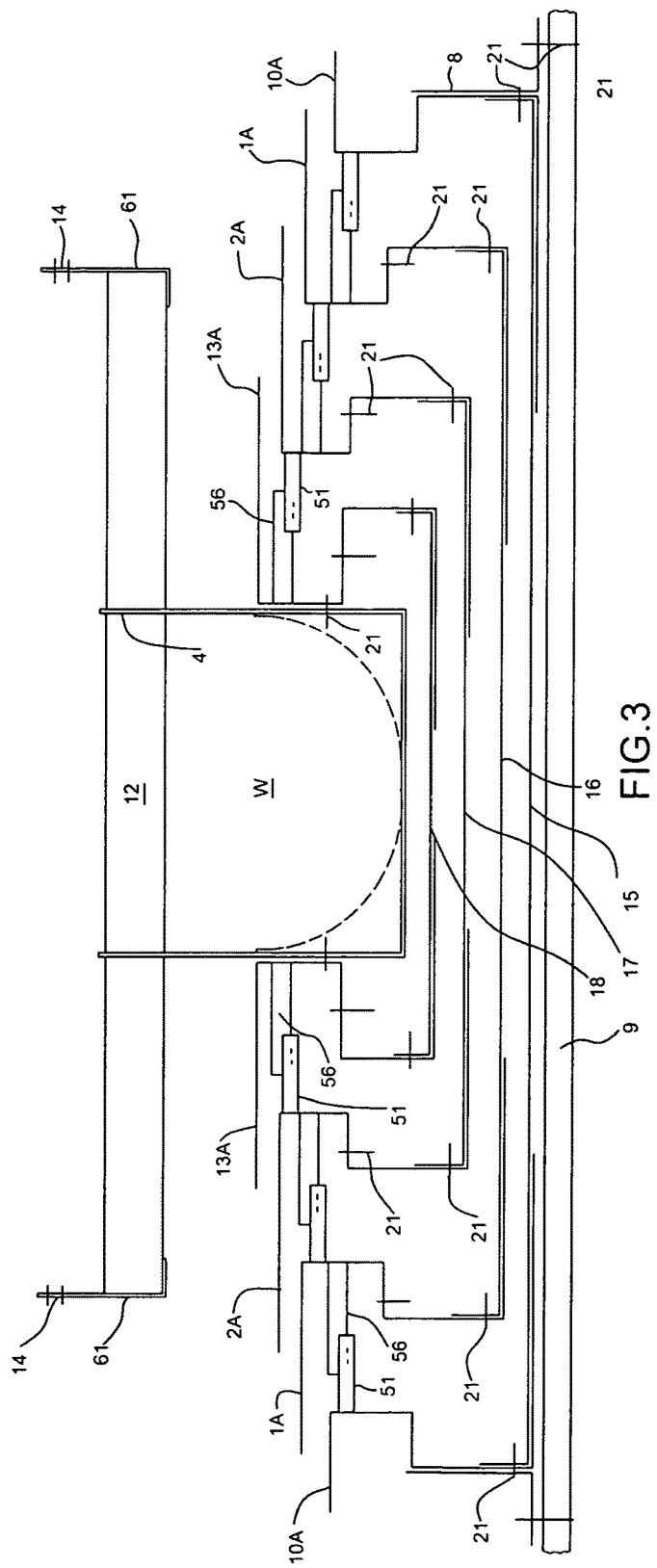
FIG. 3 is an exploded, schematic end view of the invention in the loaded position.

FIG. 3 is an end view of the telescoping slides 1 and 2 securely bound in position to telescope with a plurality of bearings within the tilt unit 10 controlling movement vertically and horizontally as well as cantilever forces when extended. Slides 1 and 2 and tilt unit 10 are shown with single width lines and non-scale to allow a fuller showing of the invention on one figure. The locations of bearings 19, 20 are depicted by the schematic showing of bolts 21 which attach the bearings to the S Rails. The relationship between slides 1 and slides 2 and other optional slides is the same with the plurality of bearings maintaining a precise control of vertical and horizontal telescoping function as well as cantilever structural integrity when extended.

Figure 4:
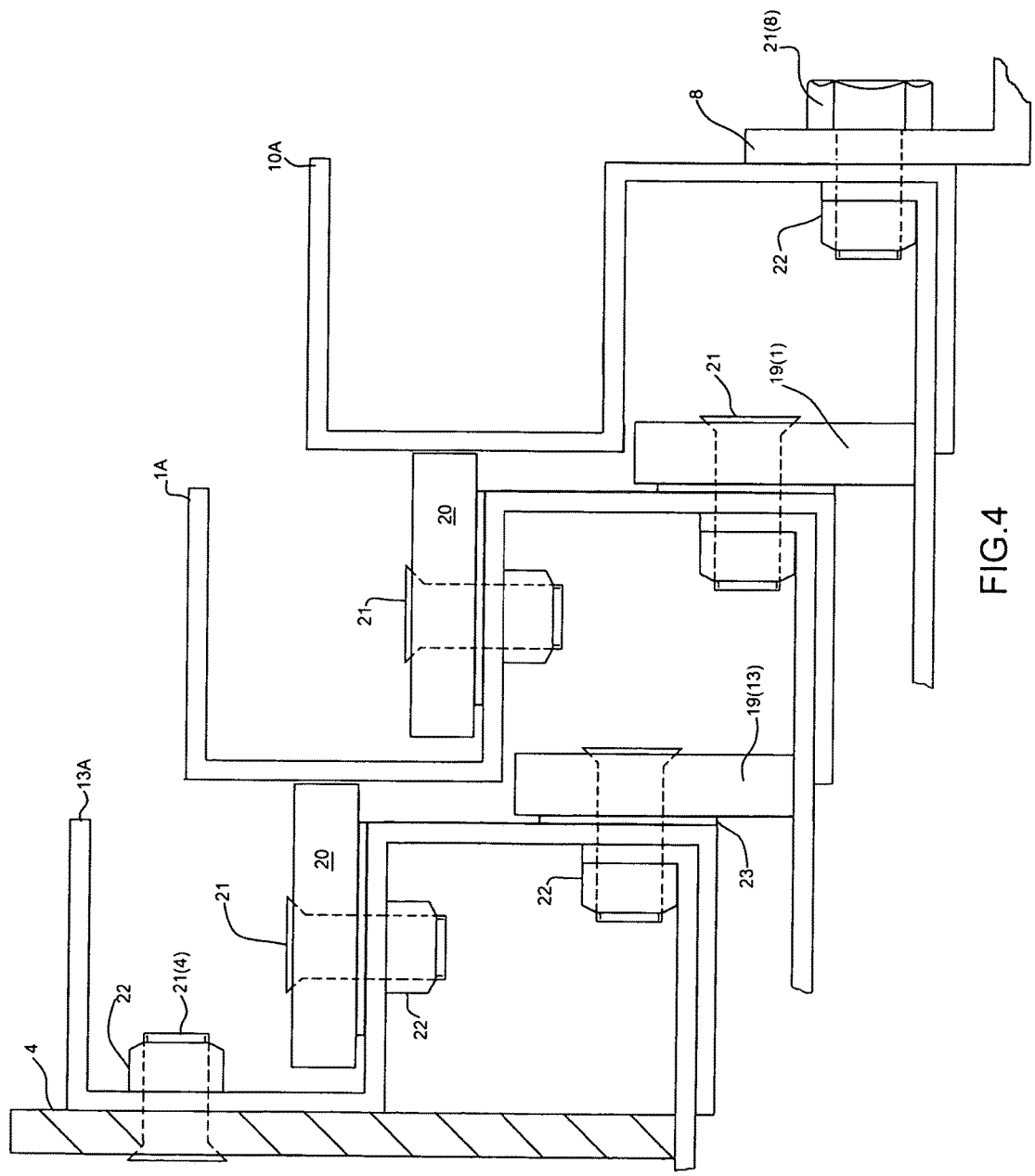
FIGS. 4 and 5 are end views of portions of the invention in the loaded position.

FIGS. 3 and 4 further explain the open-sided S-shaped RAILS 1A (S RAILS) which are the side structures of slide 1 securely fastened to the center pan 17 in the slide, S RAILS 10A which are the side structures of tilt unit 10 securely fastened to the center pan 16 the tilt unit 10, the S RAILS 13A which are the side structures of the dolly 13 securely fastened to the center pan 18 to control the proper fit and tracking of bearings 19, 20 in a precision and structurally sound manner as well as position the tilt unit 10, the slide 1, the dolly 13 to telescope inward and outward. Slide 2 is formed by S RAILS 2A which are the side structures of the slide 2 securely fastened to the center pan 17 in the slide 2.

Other elements that are shown are bracket 8 connected to tilt unit 10 through tilt S RAIL 10A by pivot bolt 21, truck portion 9, beam 12, multi-point wheel chock tie down system 61 with tie down holes 14 attached directly to beam 12 instead of flange 11 which is not present in this alternative design, stops 51 and 56 on S Rails 10A, 1A, 2A, 13A. Stops 51 and 56 are also shown in more detail in FIG. 8.

Multi-point wheel chock tie down system 61 provides holes 14 (shown schematically) for tie down straps to parallel the shocks on the front suspension of the cycle thereby protecting the triple tree front suspension as the cycle rotates up the loading process. The dotted line within the lower portion of the wheel chock 4 represents the lower portion of a tire of a motorcycle W being held by the chock.

The tie down system 61 is attached to beam 12 outward of the wheel chock 4 as shown in FIG. 3.

FIG. 4 shows a portion of the end view of FIG. 3 of the loader system 100 with the interlocked S RAILS of slides 1, tilt unit 10, and connecting pans 15, 16, 18 that make up the sliding units or assemblies showing the vertical load bearings 19 and the horizontal alignment bearings 20 with washers 23 moving in their respective tracks or bearing races or grooves built into the S RAILS 10A, 1A, 13A. Slide 2 is not shown in FIG. 4 because of lack of space.

FIG. 4 also shows one of the structures of the invention, the S RAIL 1A, 10A, 13A, and the method of using the telescoping S RAILS to fit together with a plurality of bearings to provide multiple extensions of multiple slides for extreme extension lengths with structural strength. Also shown is the space in the inside of the S RAIL bearing raceways and channel shaped areas allowing space for fasteners, structural travel limiting stops 51, 56, control wiring, power wiring, and other equipment (not shown here).

Figure 5:
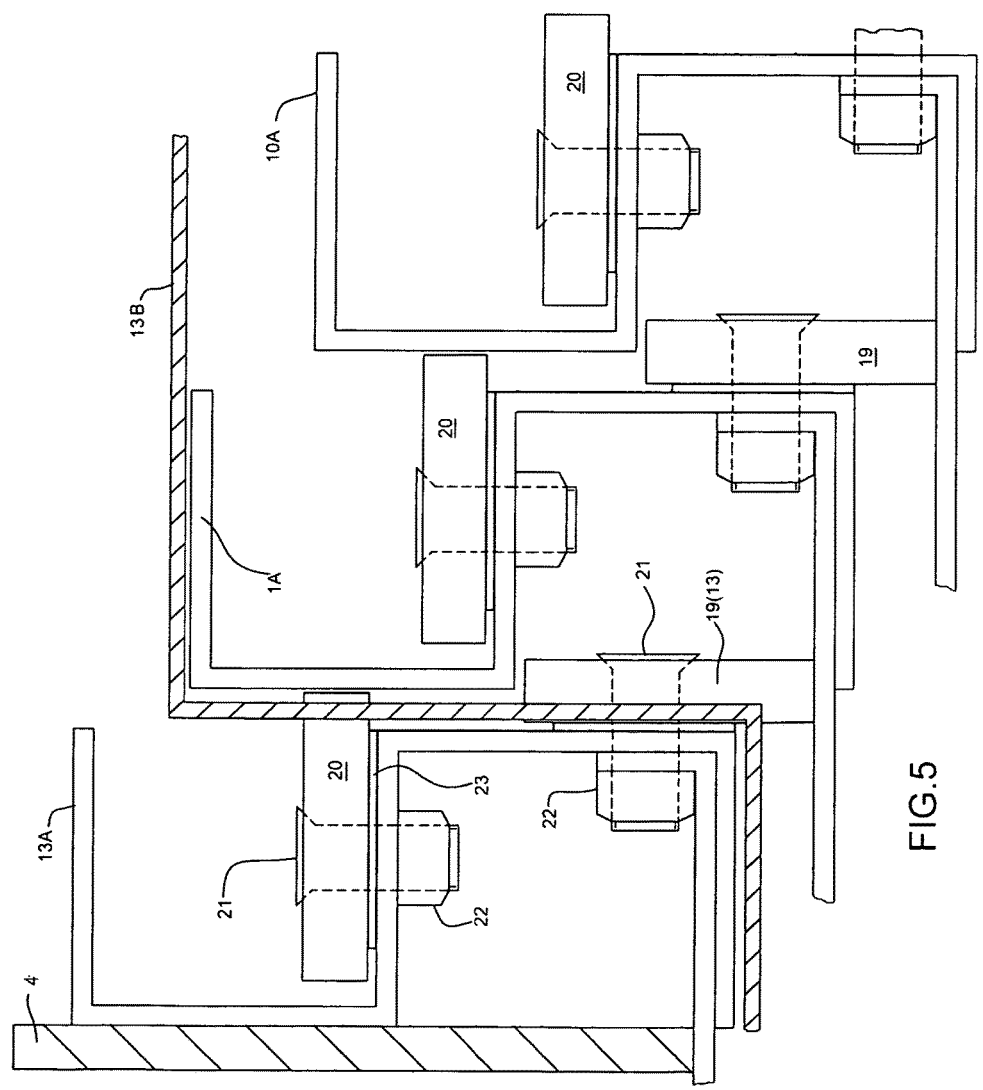

FIG. 5 defines an optional embodiment with the addition of optional full length tray 13B which is pivotally mounted through a bolt 21 (not shown) to S RAIL 13A and to dolly 13 and which in position 1 is flat on the ground and in position 2 is cradled in telescoping slides 1, 2 and others and tilt unit 10 in the loaded position on the truck or platform.

FIG. 5 is an end view of the dolly tray 13B and dolly 13. The dolly tray 13B may be any length from short to extending beyond the length of the tilt unit 10, the slides 1, 2 and others to support longer loads or motorcycles and lays flat on the ground or lower surface when loading or unloading. The dolly tray 13B attaches to the rear bearing bolt 21 on the rear of the dolly 13. The dolly tray 13B may mount a flat platform that loads yard tractors, snowmobiles, boats.

FIG. 6 shows the tilt unit 10 and slide 1 with dolly 13 and attached chock 4 protruding from the rear of a pickup truck 9 in position 1, ready to load a motorcycle W. The tilt winch 7 and cable 7A with hook attached to cable eye loop or D ring 7B on the truck 9 or mounting surface facilitating the tilt function using power to winch 7 to tilt the loader 100. The mounting bracket 8 is securely fastened to the truck bed or mounting surface. The side view clearly demonstrates the clean lines and small space occupied by the loading system in the truck bed for the purpose of using the truck for other cargo needs. The power and controls are self-contained in the S RAIL structure. The loader is removed from the truck by unplugging a 12 volt plug, removing two bolts/nuts in mounting brackets 8 and unhooking the tilt winch cable hook 7A. Due to the ability to manufacture from aluminum, removing from the truck 9 may be handled by one person.

Also shown is the travel limiting stop 40 on the front end of slide 1 and all other slides, motorcycle W and beam 12 on chock 4.

FIG. 6A shows the chock 4, dolly 13 and wheel W schematically without the SRAIL 1A of slide 1. The chock 4 holds beam 12 which holds multi-point wheel chock tie down system 61 (not shown here). Dolly 13 and attached wheel chock 4 hold wheel W and ride in slide 1 on rollers or bearings 19(13). Dolly 13 is attached to dolly winch 6 by a winch cable 6A. The dolly 13 with wheel W in the chock 4 is drawn by winch 6 farther into slide until it hits travel limiting stop 40 on slide 1 at which time both dolly and slide move into tilt unit 10 together.

Figure 7C:
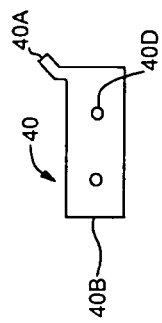
FIGS. 7A-C are views of a portion of the invention which shows one of the preferred embodiments for limiting overtravel of the telescoping components.
Figure 7A:
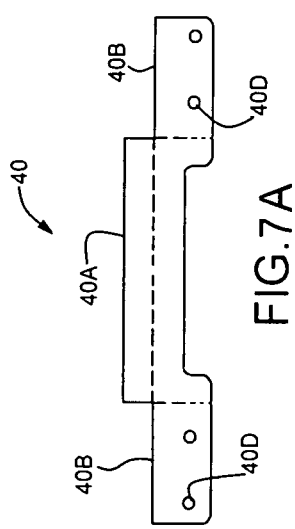
Figure 7B:
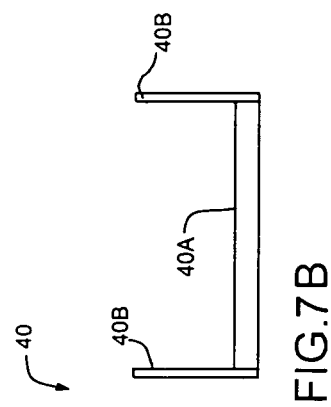

FIGS. 7A-C defines the travel limiting stop or slide end plate 40 used to stop the wheel chock 4/dolly 13 from traveling right out the front of the slide 1 or the slides and to prevent the slides from traveling right out the front of the slide below it. These stops 40 attach to the sides of the slides and tilt unit in the area provided by the S RAILS groove area. The stops 40 force the wheel chock 13 and dolly 4 and slides 1, 2 and others to travel together to the top or front of the tilt unit 10 in a controlled manner in the bearing races of the S RAILS and to end up in the second position loaded at the front of the vehicle. Due to the interlocking telescoping nature of the slides with one inside the next, the travel limiting stops 40 are a different width for each slide in a loader.

FIG. 7A shows the slide end plate of cut metal stock before it is bent to form the slide end plate or stop 40. The stock can be 0.25 inch thick hot rolled steel plate. The sides 40B are bent at 90 degrees and have holes 40D to allow attachment to the S RAILS. The center portion 40A has a cut out lower area 40C for the winch cable and is bent at its tip into a 45 degree angle. As shown, the center portion 40A has a dimension to accept the Outer Dimension (OD) of the slide.

FIG. 7B shows a top view of the slide end plate 40.

FIG. 7C shows a side view of the slide end plate 40.

FIG. 8 shows a different embodiment of the invention in which S RAIL S 10A, 1A, 2A and others provide a pull out drawer configuration or pull out platform where the need is for the drawer, deck or work bench surface or loader to move in a single plane. The winch 6 pulls it in to the second position and the winch 7 pulls it out to the first extended position. The single plane concept allows the plane to be horizontal, vertical or any angle in between including rotation clockwise or counterclockwise on another plane. The deck surface 60 may mount to the lower edge of S RAIL 2A or to the upper flat surface of the top of S RAIL of 2A (shown as 60A in dotted lines) or 1A if only one set of slides is used. The S RAILS have bearings 19, 20 held on by bolts 21 as in the first embodiment to keep the alignment of the S RAILS relative to each other.

FIG. 8A shows the stops 51, 56 in greater detail. The stops 51, 56 are held on to the S RAILS by bolts and nuts. The stop 56 shown on S RAIL 2A will be stopped by a stop 51 on S RAIL 1A to limit the movement of the S Rails. Stop 51 is not shown in this figure so that all of stop 56 could be shown. Similarly stop 56 is not shown on S RAIL 1A which would be stopped by stop 51 shown on S RAIL 10A.

FIG. 9 shows the use of multiple loaders 100 in parallel to multiply the cargo capacity and to add width to the loading platform or to accommodate four or more wheeled vehicles. The multiple loaders 100 work well in parallel due to the characteristics of DC motors that the motor with the least load runs faster thereby more or less timing them together to pull in a straight line in harmony.

The telescoping loading and unloading slide system is based on the ability to roll a load outward (unloading) by releasing winch 6, the slide winch, unspooling winch 6 for a distance past the center of gravity of the loader and cargo, and then by unspooling winch 7, the tilt winch, then the entire load can be lowered or raised on a different plane with this system. Winch 7 tilts the tilt unit 10 pivotally on mount bracket 8, and winch 6 rolls out or in the sliding trays, ramps, dollies and dolly trays or platforms. All of the unloading operations are dependent on gravity to move the cargo to the ground or a lower surface. The loading power uses the winches 6, 7 to draw the loads up against gravity. The bearings 19, 20 all run in formed raceways in tilt unit 10 and slides 1, 2 and others and create a precision movement both vertically and horizontally suitable for large loads: motorcycles, jets boats, snowmobiles, yard tractors, machinery, barrels, appliances, pallets, drums, bins, containers and other cargoes. The bearings mount securely and permanently to the slide units and dollies so as to require low winch power and improve durability. The use of hydraulics, worm drives, pneumatics, chain drives provides for movement with or without gravity help.

It should be noted that the side rails, the S RAILS, of tilt 10 and slides 1, 2 and others are joined by pans using interchangeable components as well as different pans 15, 16, 17, 18, to accomplish different functionality in different applications. It should be noted that the telescoping members mounted on the top of the truck 9 or mounting upper tilting unit 10 and the sliding members 1, 2 and others may be of similar interchangeable components.

The invention also contemplates the mounting of the loader 100 to a truck receiver hitch by using multi-hole mounting plates which clamp to the shaft protruding from the receiver hitch with a vertical beam in the upright or vertical position to mount the mounting plate and the mounting brackets of the loading system 100. The upright beam uses bumper mount brackets to stabilize the receiver mount system and is adjustable to all vehicles. Without this stabilization the receiver mount is too sloppy to safely load and transport a motorcycle or other cargo.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

SLIDE ELEMENT LIST

W cargo, motorcycle
1 slide
1A S RAIL
2 slide
4 chock
6 slide winch
6A cable for slide winch
7 tilt winch
7A cable for tilt winch
8 bracket
10 tilt unit
11 flange
12 beam
13 dolly
13A S RAIL
13B dolly tray
14 tie down hole on 61
16 pan for tilt unit 10
17 pan for slide 1
18 pan for dolly 13
19 bearing
20 bearing
21 bolt
22 nut
23 washer
40 travel limiting stop
51, 56 stop
60 deck surface (FIG. 9), platform, drawer (NN)
61 multi-point wheel chock tie down system (new number, was 161 chock tie down in claim 8)
100 loader, loading system

What is claimed is:

1. A method of moving a vehicle having wheels onto a truck having a cargo area, the cargo area having a front portion near the front of the truck, comprising the following steps:

mounting a pivot on the truck receiving the wheeled vehicle, providing a dolly comprising:
a dolly rail;
a dolly tray spanning the dolly rail;
a wheel chock mounted on the dolly tray;
a plurality of first bearings attached to the dolly rail each first bearing having a vertical rotational axis; and
a plurality of second bearings attached to the dolly rail each second bearing having a horizontal rotational axis;

providing a tilt unit comprising:
an attachment point;
a tilt winch;
a tilt winch cable attached to the tilt winch and to the front of the cargo area;
a dolly winch;
a dolly winch cable attached to the dolly;
tilt unit rails attached to the tilt unit where in the tilt unit rails are open-sided and S-shaped;

and
  a tilt unit pan attached to the tilt unit rails;
and
providing a slide unit comprising:
  a slide unit pan;
  slide rails that are open-sided and S-shaped, attached to the slide unit pan;
  a plurality of horizontal bearings attached to the slide rails each bearing having a vertical axis;
  and
  a plurality of vertical bearings attached to the slide rails each bearing having a horizontal axis;
wherein:
  the slide unit telescopes into the tilt unit and the horizontal and vertical bearing of the slide unit contact the tilt unit rails;
  and
  the-dolly telescopes into the slide unit and contacts the slide unit rails;
mounting a pivot on the truck;
attaching the tilt unit to the truck through the attachment point and the pivot;
unspooling the dolly winch cable to allow the slide unit to move outward relative to the tilt unit;
unspooling the tilt unit winch to allow the tilt unit to move upward and the slide unit to move downward on the pivot;
unspooling the dolly winch to allow the wheel chock to move to a ground position;
placing a wheel of the vehicle onto the wheel chock;
pulling the slide unit into the tilt unit by spooling the dolly winch, thereby pulling the dolly or wheel chock;
and
spooling the tilt unit winch to move the tilt unit downward onto the cargo area.

2. The method of claim 1 wherein the slide unit nests within the tilt unit such that the vertical and the horizontal bearings of the slide unit contact the tilt unit pan.

3. The method of claim 2 further comprising one or more additional slide units.

4. The method of claim 3 wherein at least one of the one or more additional slide units telescope inside of a slide unit that is disposed near a first end of the at least one slide unit and telescopes outside of a slide unit that is disposed near a second end of the at least one slide.

5. The method of claim 4 wherein the tilt unit has a rearmost end and the attachment point is disposed near the rear-most end.

* * * * *